(12) United States Patent
Kim et al.

(10) Patent No.: US 11,012,814 B2
(45) Date of Patent: May 18, 2021

(54) MONITORING SYSTEM CONTROL METHOD AND ELECTRONIC DEVICE FOR SUPPORTING SAME

(71) Applicant: Samsung Electronics Co., Ltd., Suwon-si (KR)

(72) Inventors: Hyung Woo Kim, Suwon-si (KR); Ja Min Goo, Suwon-si (KR); Ji Hyun Park, Seongnam-si (KR); Seung Hyuk Yu, Seoul (KR); Dong Kyu Lee, Seoul (KR); Jin Hong Jeong, Yongin-si (KR); Kyung Hee Lee, Ansan-si (KR); Ju Yeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/338,107

(22) PCT Filed: Oct. 11, 2017

(86) PCT No.: PCT/KR2017/011165
§ 371 (c)(1),
(2) Date: Mar. 29, 2019

(87) PCT Pub. No.: WO2018/070768
PCT Pub. Date: Apr. 19, 2018

(65) Prior Publication Data
US 2020/0029172 A1    Jan. 23, 2020

(30) Foreign Application Priority Data

Oct. 11, 2016   (KR) .................. 10-2016-0131045

(51) Int. Cl.
*H04W 4/029* (2018.01)
*G08B 13/196* (2006.01)
(Continued)

(52) U.S. Cl.
CPC ...... *H04W 4/029* (2018.02); *G08B 13/19684* (2013.01); *H04N 5/225* (2013.01); *H04M 1/725* (2013.01)

(58) Field of Classification Search
CPC .......... Y10S 901/01; G05D 2201/0203; G05D 1/0274; G05D 1/0246; G05D 2201/0215; G05D 1/0088; A47L 2201/04
See application file for complete search history.

(56) References Cited

U.S. PATENT DOCUMENTS 7,864,058 B2   1/2011   Kondo et al.
9,565,519 B2   2/2017   Liu et al.
(Continued)

FOREIGN PATENT DOCUMENTS

JP   WO2008/029724 A1   1/2010
KR   10-2006-0027728 A   3/2006
(Continued)

OTHER PUBLICATIONS

Anonymous, opencv—Detecting LED object status from Image—Stack Overflow, Jul. 26, 2013 (Jul. 26, 2013), pp. 1-4, XP055347302, Retrieved from the Internet: URL://http://stackoverflow.com/questions/10702105/detecting-led-object-status-from-image [retrieved on Feb. 17, 2017] *the whole document*.
(Continued)

*Primary Examiner* — Ernest G Tacsik
(74) *Attorney, Agent, or Firm* — Jefferson IP Law, LLP

(57) ABSTRACT

A movable electronic device includes at least one camera module, a driving module configured to support movement on a specified path of the electronic device, and a processor electrically connected to the camera module and the driving module. The processor is configured to control the electronic device to perform capture while moving on a specified first path and to set the first path to a second path based on state
(Continued)

information about at least one Internet of Things (IoT) device obtained based on a capture image on the first path.

19 Claims, 8 Drawing Sheets

(51) Int. Cl.
*H04N 5/225* (2006.01)
*H04M 1/725* (2021.01)

(56) References Cited

U.S. PATENT DOCUMENTS

| | | | |
|---|---|---|---|
| 2009/0021381 A1 | 1/2009 | Kondo et al. | |
| 2014/0207282 A1* | 7/2014 | Angle | G05B 15/02 700/257 |
| 2014/0218517 A1* | 8/2014 | Kim | H04N 21/41407 348/143 |
| 2014/0324271 A1* | 10/2014 | Oh | G05B 15/00 701/28 |
| 2015/0088310 A1* | 3/2015 | Pinter | G06Q 50/22 700/253 |
| 2015/0130957 A1* | 5/2015 | Berelejis | H04N 5/23206 348/211.1 |
| 2016/0103451 A1* | 4/2016 | Vicenti | G05D 1/0242 700/259 |
| 2016/0105763 A1 | 4/2016 | Liu et al. | |
| 2016/0150350 A1* | 5/2016 | Ingale | H04W 12/08 370/255 |
| 2016/0188977 A1* | 6/2016 | Kearns | G05D 1/0274 348/113 |
| 2017/0168486 A1* | 6/2017 | Tommy | G05D 1/0016 |
| 2017/0329347 A1* | 11/2017 | Passot | A47L 11/4011 |
| 2018/0152673 A1* | 5/2018 | Kim | H04N 5/23206 |
| 2019/0166333 A1 | 5/2019 | Kim et al. | |

FOREIGN PATENT DOCUMENTS

| | | |
|---|---|---|
| KR | 10-2006-0096602 A | 9/2006 |
| KR | 10-2006-0109153 A | 10/2006 |
| KR | 10-2014-0077817 A | 6/2014 |
| KR | 10-2016-0113440 A | 9/2016 |

OTHER PUBLICATIONS

European Search Report dated May 20, 2019, issued in the European patent application No. 17859960.1.
European Office Action dated Nov. 6, 2019, issued in European Patent Application No. 17859960.1.

* cited by examiner

500

| ZONE INFORMATION | DEVICE INFORMATION | STATE INFORMATION | DYNAMIC OBJECT | PATH UPDATE INFORMATION |
|---|---|---|---|---|
| LIVINGROOM | LIGHT | OFF | ABSENCE | NON-DRIVING |
| BIG ROOM | TV | ON | ABSENCE | DRIVING |
| SMALL ROOM | COMPUTER | ON | ABSENCE | DRIVING |
| KITCHEN | OVEN | ON | PRESENCE | DRIVING |
| BALCONY | DOORLOCK | OFF | ABSENCE | NON-DRIVING |
| WAREHOUSE | -- | -- | ABSENCE | NON-DRIVING |

FIG.5

MONITORING SYSTEM CONTROL METHOD AND ELECTRONIC DEVICE FOR SUPPORTING SAME

TECHNICAL FIELD

Various embodiments disclosed herein relate to a technology for controlling a monitoring system of an Internet of Things (IoT) environment.

BACKGROUND ART

Due to the rapid development of network technology and smart devices, the so-called IoT environment for establishing an intelligent communication infrastructure for objects equipped with communication functions has been proposed. With regard to the operation of the IOT environment, electronic devices of various types that detect abnormal situations based on continuous or periodic monitoring of IoT devices have been developed.

DISCLOSURE

Technical Problem

For example, the electronic device may capture the IoT devices to support the operation management of an IoT environment, while moving along a specified path. However, as the electronic device repeatedly moves along only the specified path, the electronic device may be prevented from formalizing the operation management of the IoT environment and establishing an optimized monitoring system.

Various embodiments of the disclosure may provide a monitoring system controlling method capable of controlling the driving pattern of a mobile electronic device that performs monitoring of an IoT environment based on the state information of the IoT devices, and an electronic device supporting the same.

Technical Solution

A movable electronic device according to an embodiment may include at least one camera module, a driving module configured to support movement on a specified path of the electronic device, and a processor electrically connected to the camera module and the driving module.

According to an embodiment, the processor may be configured to control the electronic device to perform capture while moving on a specified first path and to set the first path to a second path based on state information about at least one Internet of Things (IoT) device obtained based on a capture image on the first path.

Advantageous Effects

According to various embodiments, the monitoring driving path of the mobile electronic device may be changed depending on the state of the IoT devices, thereby simplifying the integrated management platform for IoT devices.

According to various embodiments, the driving of a mobile electronic device may be improved, thereby reducing the cost or power consumption involved in the operating management of the IoT environment.

Besides, a variety of effects directly or indirectly understood through this disclosure may be provided.

DESCRIPTION OF DRAWINGS

FIG. 5 is a view illustrating monitoring information of an electronic device, according to an embodiment.

MODE FOR INVENTION

Figure 1:
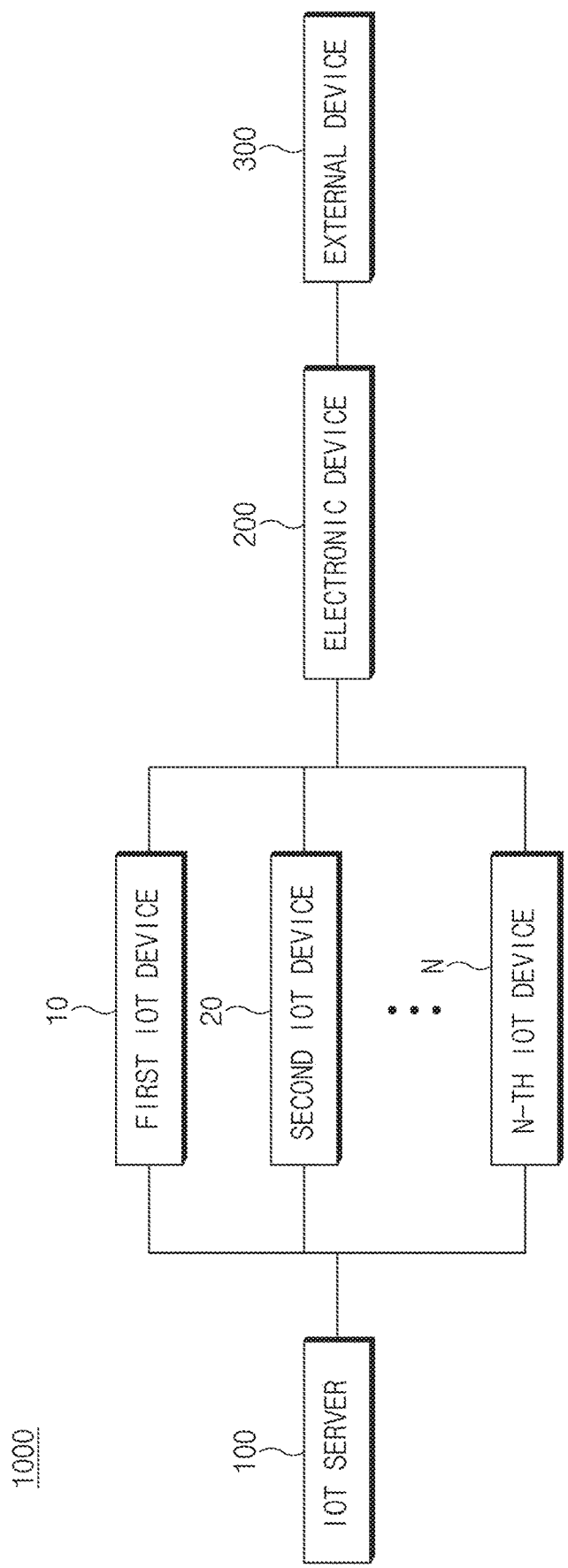
FIG. 1 is a diagram illustrating an example of an IoT environment, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a diagram illustrating an example of an IoT environment, according to an embodiment.

In an embodiment, an IoT environment 1000 may include a context recognition-based intelligent infrastructure established between an object and an object based on a communication network. The IoT environment 1000 may be created for centralized control in areas or fields such as homes, buildings, industrial plants, smart grids, or the like. In the following embodiments, the IoT environment in a home area (e.g., smart home) will be described as an example.

Referring to FIG. 1, the IoT environment 1000 may include an IoT server 100, at least one IoT device 10, 20, and/or N, an electronic device 200, and an external device 300. In various embodiments, the IoT environment 1000 may omit at least one of the above-described components or may further include another component.

The IoT server 100 may include an operating system capable of collectively managing the at least one IoT device 10, 20, and/or N. The IoT server 100 is electrically or communicatively connected to the at least one IoT device 10, 20, and/or N by establishing a network (e.g., ad-hoc, Internet, or the like), and the IoT server 100 may interact with each IoT device 10, 20, and/or N based on the network. For example, the IoT server 100 may receive various pieces of operation information accompanied in the IoT environment 1000, from each IoT device 10, 20, and/or N in the form of real time, batch, stream, or the like and may establish the database of the received pieces of information. Furthermore, the IoT server 100 may transmit a control signal associated with the driving control of the corresponding device, to the least one IoT device 10, 20, and/or N.

In various embodiments, the IoT server 100 may include a non-volatile or volatile memory of a high-capacity, such as a disk drive, and may include a processor coupled (or electrically or functionally connected) to the memory. Also, the IoT server 100 may be implemented as a single server or a plurality of servers. An embodiments is exemplified in FIG. 1 as the IoT server 100 collectively manages the at least one IoT device 10, 20, and/or N. However, an embodiment is not limited thereto. The IoT server 100 may include a variety of platforms capable of processing data of high-capacity or high-speed.

The at least one IoT device 10, 20, and/or N may include electronic appliances (e.g., air conditioners, ovens, TV, refrigerators, or the like), security devices (e.g., door locks, CCTV, or the like), sensors, or the like, which is serviced based on IoT technology. In an embodiment, the at least one IoT device 10, 20, and/or N may be equipped with communication function and may access the network based on the communication function to transmit, to the IoT server 100, operation information such as identification information, attribute information, location information, motion information, shape information, or state information. Furthermore, the at least one IoT device 10, 20, and/or N may be electrically or functionally connected through a public interface or wired connection, such as the network.

The electronic device 200 (e.g., a drone or mobile robot) may be a mobile device equipped with driving, walking or flight functions and may perform monitoring on the at least one IoT device 10, 20, and/or N. In this regard, the electronic device 200 may include at least one camera module and may obtain information associated with the at least one IoT device 10, 20, and/or N based on the image or video captured by the camera module. The electronic device 200 may transmit, to the external device 300 described below, the image or video and the obtained information.

In an embodiment, the electronic device 200 may drive (or walk or fly) along a specified path in the region of the IoT environment 1000 in response to a user's control or specified scheduling information. Alternatively, when there is no information about the specified path, the electronic device 200 may perform the first autonomous driving to secure the route (or path) and then may set the root (or path) to a periodical driving path.

For example, the external device 300 may be an electronic device (e.g., a smartphone, or the like) operated by a user and may transmit, to the IoT server 100, the control signal associated with the operation of the at least one IoT device 10, 20, and/or N based on the user's control performed by the external device 300. Alternatively, the external device 300 may transmit, to at least one of the electronic device 200 or the IoT server 100, a control signal for scheduling the driving pattern of the electronic device 200 at a specified time or periodically. In this regard, the external device 300 may include a dedicated application program for accessing the IoT environment 1000. The external device 300 may synchronize information about the at least one IoT device 10, 20, and/or N with the IoT server 100 based on the application program.

In various embodiments, the external device 300 may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices.

Hereinafter, various embodiments capable of efficiently managing the operation management of the IoT environment 1000 by updating or changing the monitoring driving path of the electronic device 200 based on the information about the at least one IoT device 10, 20, and/or N will be described.

Figure 2:
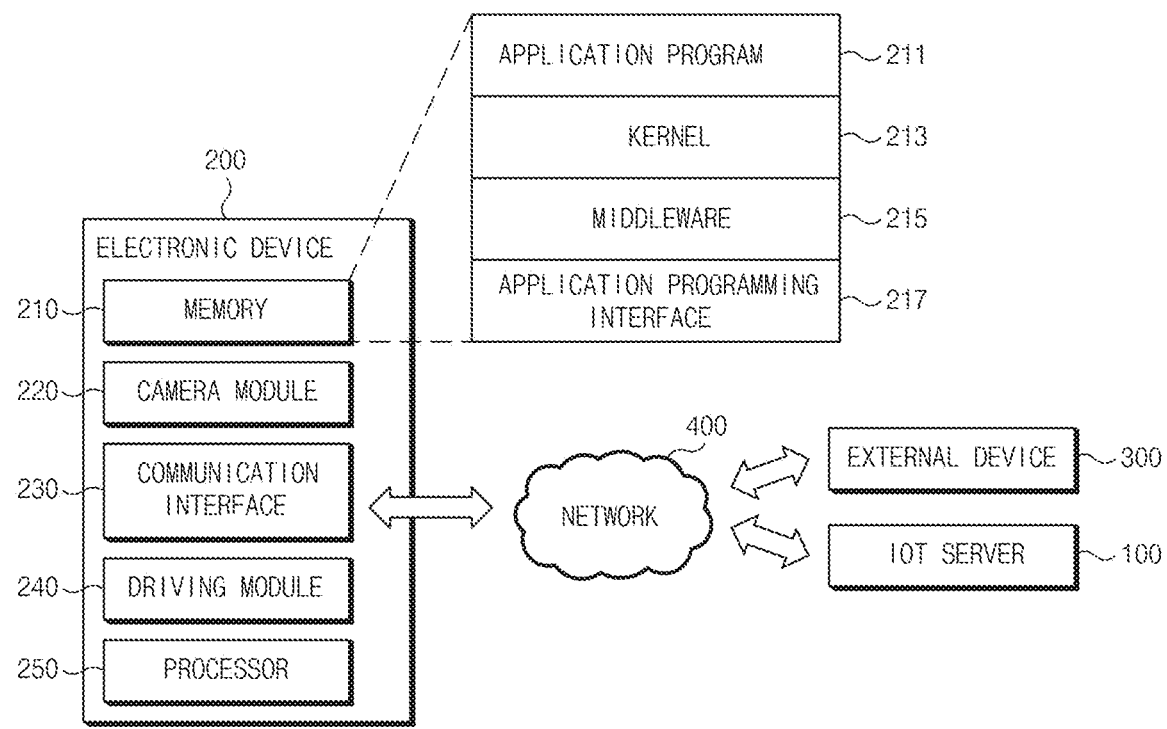
FIG. 2 is a view illustrating a configuration of an electronic device, according to an embodiment.

FIG. 2 is a view illustrating a configuration of an electronic device, according to an embodiment.

Referring to FIG. 2, the electronic device 200 may establish a network 400 with at least one of the IoT server 100 or the external device 300. The electronic device 200 may transmit or receive information associated with the operation of the IoT environment 1000 to or from the external device 300 and the IoT server 100, by performing wired communication or wireless communication to access the network 400. In various embodiments, the network 400 may include at least one of a computer network (e.g., local area network (LAN) or wide area network (WAN)), Internet, or a telephone network.

In an embodiment, the electronic device 200 may include a memory 210, a camera module 220, a communication interface 230, a driving module 240, and a processor 250. In some embodiments, the electronic device 200 may omit at least one of the above-described components or may further include another component.

The memory 210 may store an image or video captured by the camera module 220 of the electronic device 200. Furthermore, the memory 210 may store information associated with at least one IoT device 10, 20, and/or N of FIG. 1 or the driving path information of the electronic device 200, which is transmitted or received via the network 400. In various embodiments, the memory 210 may include at least one program associated with the monitoring function for the at least one IoT device 10, 20, and/or N of the electronic device 200. The program may include an application program 211, a kernel 213, a middleware 215, or an application programming interface (API) 217.

The application program 211 may include a dedicated application program for accessing the IoT environment 1000 in FIG. 1.

The kernel 213 may control or manage system resources (e.g., the memory 210, the processor 250, and the like) that are used to execute operations or functions implemented in other programs (e.g., the application program 211, the middleware 215, the API 217). Moreover, the kernel 213 may provide an interface that allows the application program 211, the middleware 215, or the API 217 to access discrete components of the electronic device 200 so as to control or manage system resources.

The middleware 215 may perform, for example, a mediation role such that the application program 211 or the API 217 can communicate with the kernel 213 to transmit or receive data. Furthermore, the middleware 215 may process one or more task requests received from the application program 211 according to a priority. For example, the middleware 215 may assign the priority, which makes it possible to use a system resource (e.g., the memory 210, the processor 250, or the like) of the electronic device 200, to at least one of the application program 211. The middleware 215 may perform scheduling, load balancing, or the like on the at least one task request based on the priority.

The API 217 may be an interface through which the application program 211 controls a function provided by the kernel 213 or the middleware 215, and may include, for example, at least one interface or function (e.g., an instruction) for a file control, a window control, image processing, a character control, or the like.

In various embodiments, the memory 210 may include at least one of a volatile memory (e.g., a dynamic random access memory (DRAM), a static RAM (SRAM), or a synchronous DRAM (SDRAM)), or a nonvolatile memory (e.g., a one-time programmable read only memory (OTPROM), a programmable ROM (PROM), an erasable and programmable ROM (EPROM), an electrically erasable and programmable ROM (EEPROM)), a mask ROM, a flash ROM, a flash memory or the like.

The camera module 220 may be mounted in one region of the electronic device 200 to capture the image or video of the at least one IoT device 10, 20, and/or N placed on the driving path of the electronic device 200 (or in a region adjacent to the driving path). In an embodiment, the plurality of camera modules 220 may be provided, and each of the plurality of camera modules 220 may be disposed in the electronic device 200 to perform capture for different directions (or regions). For example, the plurality of camera modules 220 may be disposed on the electronic device 200 to capture a region divided at each interval of 120 degrees. Alternatively, the plurality of camera modules 220 may be disposed at opposite locations on the electronic device 200 to capture the front view and rear view of the electronic device 200. Moreover, the plurality of camera modules 220 may be fixed at a point disposed on the electronic device 200 or may be at least partly movably disposed such that the capture direction is changed in response to the user's control or specified scheduling information. In various embodiments, under the editing (e.g., stitching) performed by the processor 250, the image or the video captured by the plurality of camera modules 220 may be stored in the memory 210.

The communication interface 230 may establish communication between the electronic device 200 and the IoT server 100 or the external device 300. For example, the electronic device 200 may perform wireless communication or wired communication with the IoT server 100 or the external device 300, by accessing the network 400 based on the communication interface 230.

In various embodiments, the wireless communication may include at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), as a cellular communication protocol. Moreover, wireless communication may include short range communication such as Wireless Fidelity (Wi-Fi), Bluetooth, Near Field Communication (NFC), magnetic stripe transmission (MST), or the like.

The driving module 240 may include at least one component or device that supports the driving, walking, or flight functions of the electronic device 200. For example, the driving module 240 may include a motor for generating power energy, a speed reducer for controlling the driving of the motor, a braking device for braking the motor, a wheel and wheel assembly (or, a propeller) for rotating by receiving power from the motor, or a steering device that controls the steering angle of the wheel and wheel assembly. In addition, the driving module 240 may further include a power supply device (e.g., battery) that supports electrochemical power energy to the above-described components. In an embodiment, under the control of the processor 250, the driving module 240 may operate to allow the electronic device 200 to drive, walk or fly on a specified driving path.

The processor 250 may be electrically or operatively connected to at least another component of the electronic device 200 to perform control, communication operations, or data processing on the component. For example, the processor 250 may receive, from the IoT server 100, at least one of information (e.g., identification information, attribute information, location information, motion information, shape information, state information, or the like) about the at least one IoT device 10, 20, and/or N, the operating region information (e.g., blueprint) of the IoT environment 1000 of FIG. 1 and may set the driving path of the electronic device 200 based on the received information.

In an embodiment, the processor 250 may perform image processing on the image or video captured by the camera module 220. The processor 250 may identify the at least one IoT device 10, 20, and/or N included in the image or video based on the image processing, and may perform analysis on each IoT device. Alternatively, the processor 250 may access the IoT server 100 based on the network 400 and may make a request for information about the identified at least one IoT device 10, 20, and/or N, to the IoT server 100. In an embodiment, the processor 250 may map the information of the at least one IoT device 10, 20, and/or N, which is analyzed through the image processing or which is received from the IoT server 100, to the blueprint associated with the operating region of the IoT environment 1000. For example, the processor 250 may map the information of the first IoT device to a point on the blueprint corresponding to the region in which the first IoT device is disposed.

Figure 3:
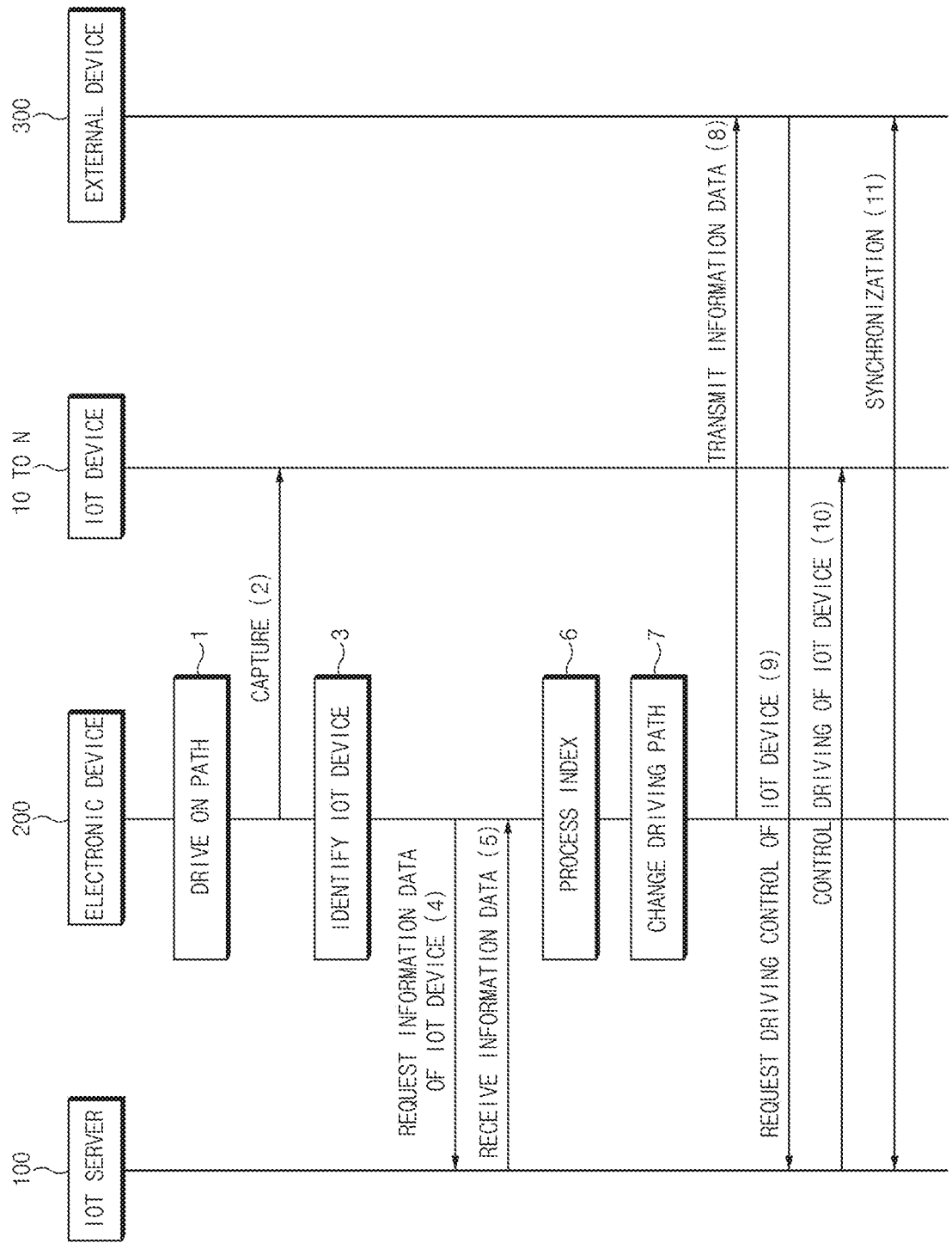
FIG. 3 is a diagram illustrating a signal flow between configurations in an IoT environment, according to an embodiment.

FIG. 3 is a diagram illustrating a signal flow between configurations in an IoT environment, according to an embodiment.

Referring to FIG. 3, in operation 1, the electronic device 200 may drive (or walk or fly) in the operating region (e.g., the inside of a house) of the IoT environment 1000 of FIG. 1, based on specified driving path information. In an embodiment, the driving path may be specified by a user's control via the external device 300 or may be set based on the initial autonomous driving of the electronic device 200.

In operation 2, the electronic device 200 may capture the operating region (e.g., the inside of a house) of the IoT environment 1000, while moving on a specified driving path. For example, the electronic device 200 may capture the at least one IoT device 10, 20, and/or N disposed in at least one direction with respect to the electronic device 200, based on the provided at least one camera module 220 of FIG. 2.

In operation 3, operation 4, and operation 5, the electronic device 200 may identify the at least one IoT device 10, 20, and/or N, which is present in the captured image or video. In this regard, the processor 250 of FIG. 2 of the electronic device 200 may detect at least one object by preforming image processing (e.g., edge detection filter, active contours model, or the like) on the image or video. The processor 250 may identify the at least one IoT device 10, 20, and/or N present in the image or video, by comparing the detected at least one object with information (e.g., identification information, attribute information, location information, motion information, shape information, state information, or the like) about the at least one IoT device 10, 20, and/or N received from the IoT server 100. In various embodiments, the at least one IoT device 10, 20, and/or N may individually include information about bar coding or RFID tag. In this case, the electronic device 200 may include a scanner or reader capable of reading out the information about bar coding or RFID tag, and the processor 250 may identify the at least one IoT device 10, 20, and/or N in the image or video captured based on the scanner or reader.

In an embodiment, the processor 250 may determine the state of the identified at least one IOT device 10, 20, and/or N, based on the image processing. In this regard, the processor 250 may detect the change of the at least one IoT device 10, 20, and/or N, through comparing the image captured at the first time of the electronic device 200 with the image captured at the second time after the first time. Alternatively, the processor 250 may detect the change in the at least one IoT device 10, 20, and/or N with reference to the difference image between a plurality of frames constituting the image. In an embodiment, when the change of the at least one IoT device 10, 20, and/or N is detected in the image or video, the processor 250 may compare the change of the at least one IoT device 10, 20, and/or N with information (e.g., identification information, attribute information, location information, motion information, shape information, state information, or the like) about the at least one IoT device 10, 20, and/or N received from the IoT server 100 to determine the real-time state of the IoT device in which the change has occurred. For example, the state determination may include the determination of whether the power of the at least one IoT device 10, 20, and/or N is turned on or off.

In operation 6, the processor 250 may map information (e.g., identification information, attribute information, location information, motion information, shape information, state information, or the like) about the identified at least one IoT device 10, 20, and/or N, to the blueprint associated with the operating region of the IoT environment 1000 received from the IoT server 100. In various embodiments, the mapped information about the IoT device 10, 20, and/or N may include at least one of the information associated with the IoT device 10, 20, and/or N received from the IoT server 100 or real-time state information of the IoT device 10, 20, and/or N determined based on the image processing.

In operation 7, the processor 250 may change or update the driving path of the electronic device 200. In this regard, in an embodiment, upon performing the image processing, it may be determined that there is no dynamic object (e.g., a person, an animal, or the like) in a first zone; it may be determined that the first IoT device disposed in the first zone is in an off-state, based on the information about the at least one IoT device 10, 20, and/or N received from the IoT server 100 or real-time state information of the at least one IoT device 10, 20, and/or N. In this case, the processor 250 may change the first driving path set in the electronic device 200 to the second driving path excluding the driving to the first zone.

In operation 8, the processor 250 may transmit, to the external device 300, the image or video (or, the mapped blueprint) captured through the camera module 220 and information (e.g., identification information, attribute information, location information, motion information, shape information, state information, or the like) about the at least one IoT device 10, 20, and/or N identified in the image or video. In this operation, the external device 300 may output feedback, such as vibration or notification sound, at the same time with receiving the pieces of information from the electronic device 200 or within a specified time range from the reception.

In operation 9, operation 10, and operation 11, a user may control the driving of an arbitrary IoT device based on the external device 300 and may transmit a driving control signal to the IoT server 100, based on the information about the IoT device 10, 20, and/or N received from the electronic device 200. The IoT server 100 may control the corresponding IoT device in response to the driving control signal and may transmit control information (e.g., control result information) about the corresponding IoT device to the external device 300 to synchronize operation information about the IoT environment 1000.

Figure 4:
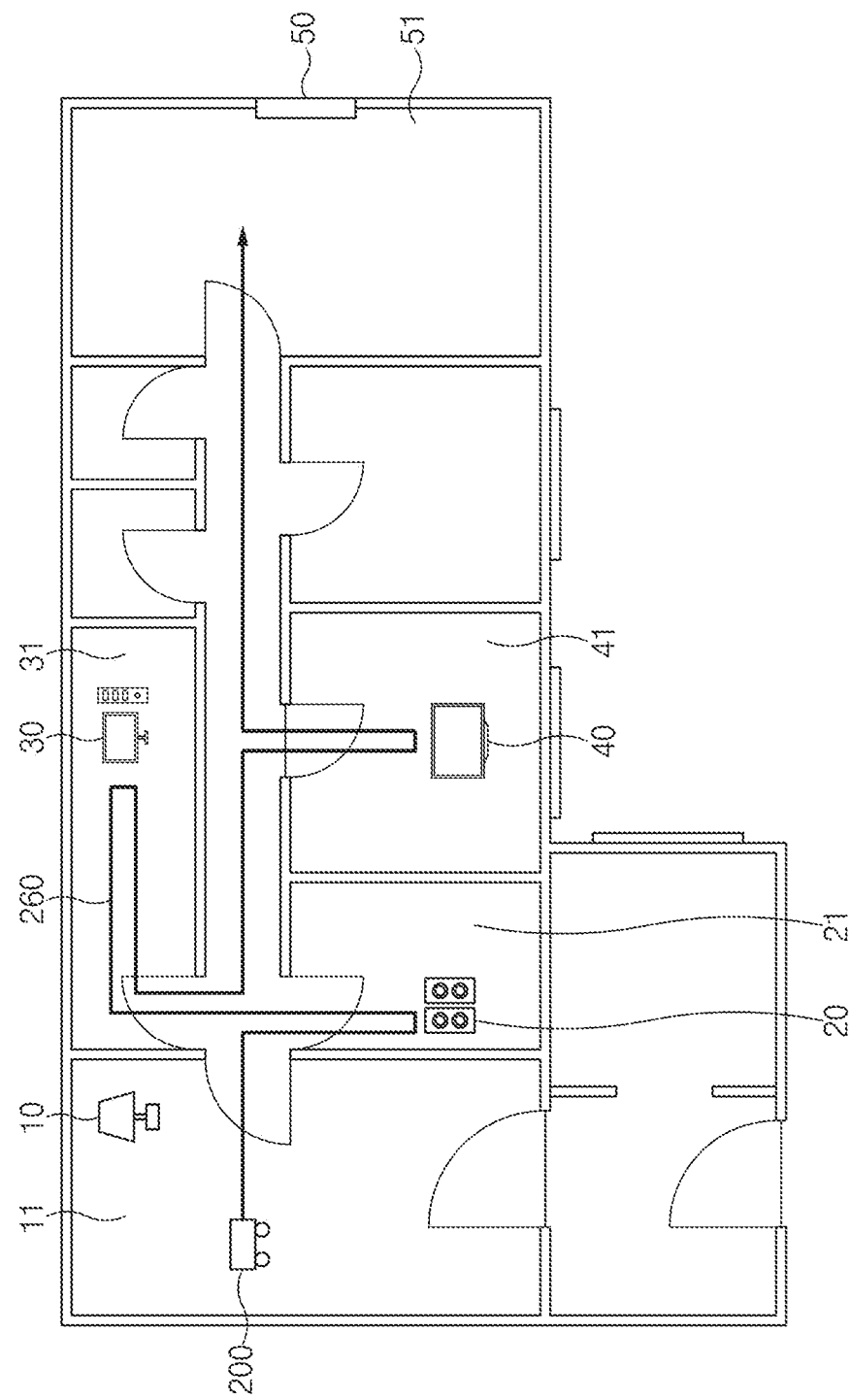
FIG. 4 is a view illustrating a first driving path of an electronic device, according to an embodiment.
Figure 6:
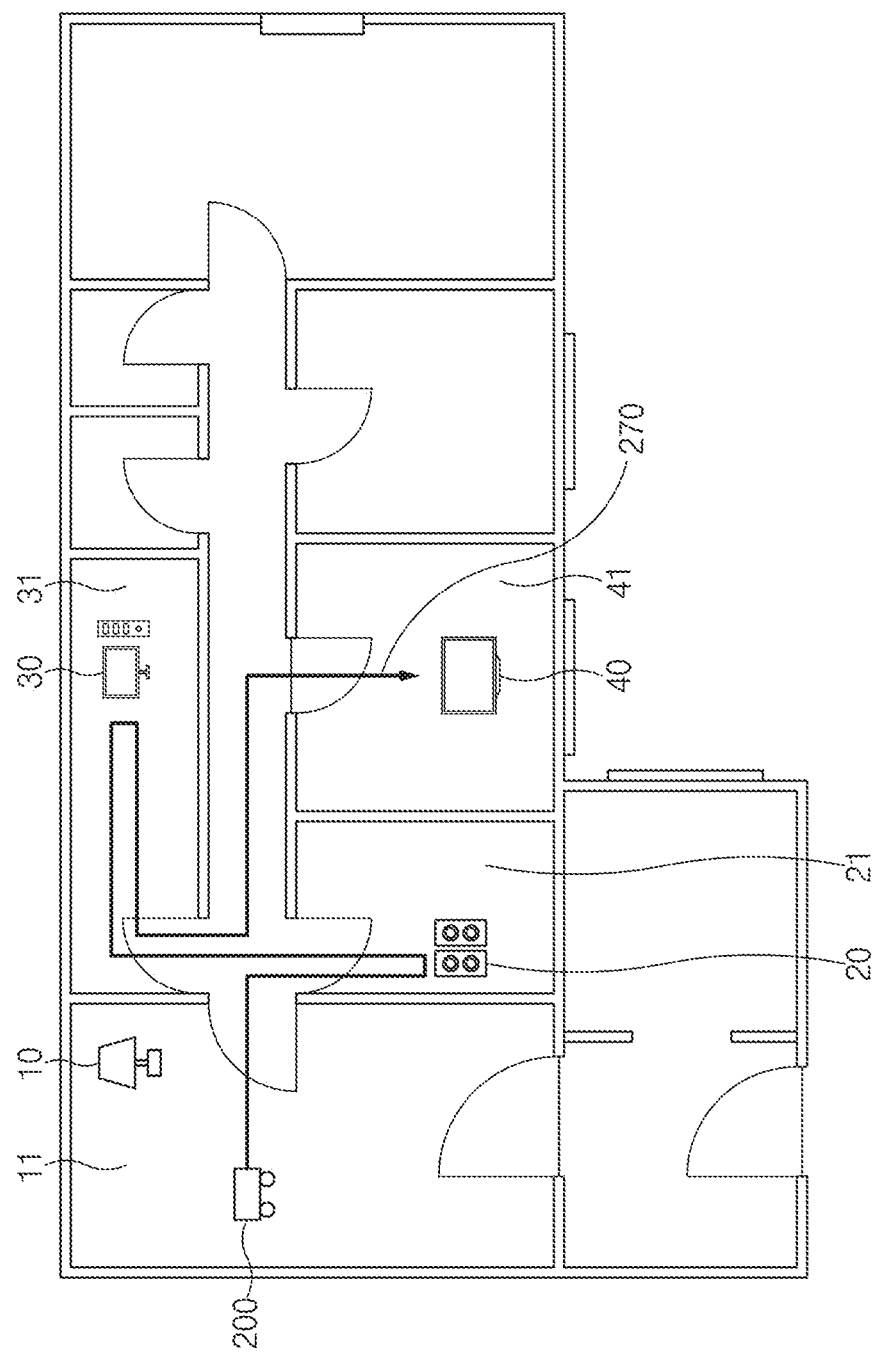
FIG. 6 is a view illustrating a second driving path of an electronic device, according to an embodiment.

FIG. 4 is a view illustrating a first driving path of an electronic device, according to an embodiment. FIG. 5 is a view illustrating monitoring information of an electronic device. FIG. 6 is a view illustrating a second driving path of an electronic device.

Referring to FIGS. 4, 5, and 6, the electronic device 200 may drive (or walk or fly) on a specified first path 260 in the operating region (e.g., the inside of the house) of the IoT environment 1000 of FIG. 1, in response to a user's control or specified scheduling information. For example, the electronic device 200 may drive on the first path 260 that reaches a fifth zone 51 via a second zone 21, a third zone 31, and a fourth zone 41, starting from a first zone 11 where the driving is started. While driving on the first path 260, the electronic device 200 may capture at least one IoT device 10, 20, 30, 40, and/or 50 disposed in (or adjacent to) the first to fifth zones 11 to 51, based on the provided at least one camera module 220 of FIG. 2. In this operation, the electronic device 200 may identify at least one IoT device 10, 20, 30, 40, and/or 50 by analyzing (e.g., image processing) the captured image or video. The electronic device 200 may compare the identified at least one IoT device 10, 20, 30, 40, and/or 50 with information (e.g., identification information, attribute information, location information, motion information, shape information, state information, or the like) about at least one IoT device 10, 20, 30, 40, and/or 50 provided from the IoT server 100 of FIG. 1 to determine the state (e.g., real-time state) of the identified at least one IoT device 10, 20, 30, 40, and/or 50.

In an embodiment, the electronic device 200 may store the monitoring information about the first path 260 in a table 500 as illustrated in FIG. 5, within a specified time from a point in time when the fifth zone 51 corresponding to the end point of the first path 260 is reached. The electronic device 200 may update or change the first path 260 based on the table 500. Referring to FIGS. 5 and 6, for example, when it is determined that the fifth IoT device 50 (e.g., doorlock) located in the fifth zone 51 is in an off-state (or closed) and when a dynamic object (e.g., a person, an animal, or the like) is not detected in the fifth zone 51, the electronic device 200 may exclude the fifth zone 51 on a second path 270 for driving (or updated or changed) later. In an embodiment, when the IoT device is turned off and the dynamic object is not present as in fifth zone 51, the electronic device 200 may exclude the driving or monitoring of the corresponding zone.

In various embodiments, the driving path of the electronic device 200 may be updated or changed based on various conditions within the operating region of the IoT environment 1000. For example, when it is determined that the fourth IoT device 40 (e.g., TV) disposed in the fourth zone 41 is in an on-state (or turned on) although a dynamic object is not detected in the fourth zone 41, the electronic device 200 may maintain monitoring of the fourth zone 41 on the second path 270 for driving later, for the purpose of monitoring the fourth IoT device 40 again. In this case, the electronic device 200 may transmit, to an external device 300 in FIG. 2, state information about the fourth IoT device 40 and the image or video including the fourth IoT device 40.

Alternatively, in various embodiments, when the electronic device 200 detects a dynamic object in a specific zone (e.g., kitchen) and it is determined that an IoT device (e.g., oven) is turned on, the electronic device 200 may maintain monitoring of the specific zone (e.g., kitchen) on the subsequent driving path. Alternatively, in various embodiments, upon driving or monitoring a specific zone (e.g. warehouse), when it is determined that at least one IoT device is not present in the warehouse, the electronic device 200 may exclude the specific zone (e.g., warehouse) on the second path 270 for driving later.

In various embodiments, when the electronic device 200 reaches the end point zone of the first path 260 or the second path 270, the electronic device 200 may move to the starting zone of driving by performing the driving inversely. Moreover, when at least one IoT device on the second path 270 is not changed for the number of times that the driving of changed second path 270 is performed, the electronic device 200 may update the driving path to the first path 260, which is the previous path. Alternatively, when a new object (e.g., dynamic object) is detected on the specified driving zone (or driving path), the currently set driving path may be updated to the previous driving path.

Figure 7:
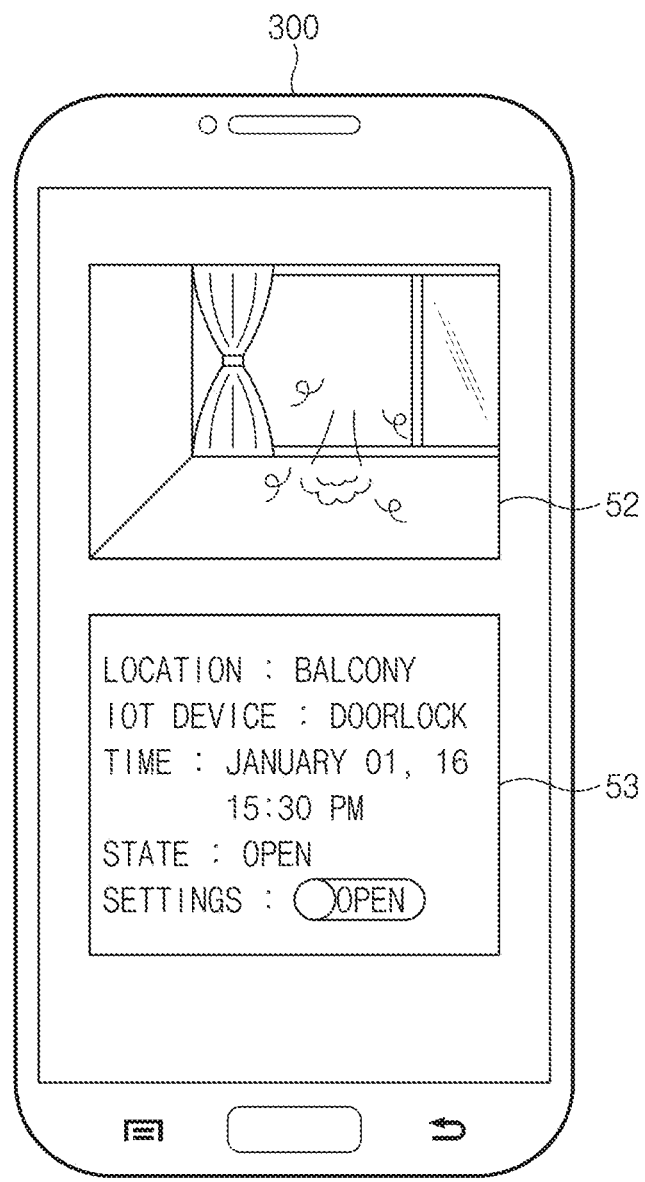
FIG. 7 is a view illustrating a user interface associated with IoT device control, according to an embodiment.

FIG. 7 is a view illustrating a user interface associated with IoT device control, according to an embodiment.

As mentioned above, the dynamic object is not detected in the specific zone during the driving or monitoring of the electronic device 200 of FIG. 2. However, it is may be determined that the IoT device disposed in the corresponding zone is in an on-state (or opened or turned on). The electronic device 200 may transmit, to the external device 300, state information about the corresponding IoT device and the captured image or video.

In this regard, referring to FIG. 7, a user may execute a dedicated application program capable of accessing the IoT environment 1000 based on the external device 300 to identify and control information received from the electronic device 200 (e.g., state information of the IoT device and the captured image or video). For example, the execution screen of the dedicated application program may include an image or a picture 52 including an IoT device and a display object 53 indicating state information about the IoT device. The user may determine the operating situation of the IoT environment 1000 in FIG. 1 with reference to the image or the picture 52 and the display object 53 and may control at least one IoT device. The control signal for the IoT device of the user may be transmitted to the IoT server 100 in FIG. 2 based on the network 400 of FIG. 2, and the IoT server 100 may control the driving of the IoT device in response to the control signal of the user.

In various embodiments, the user may control the driving pattern of the electronic device 200 on the dedicated application program (or the web page associated with the IoT server 100). In this regard, operation information (e.g., identification information, attribute information, location information, motion information, shape information, state information, or the like) of at least one IoT device associated with information synchronization with at least one of the IoT server 100 or the external device 300 may be displayed on the dedicated application program. For example, the user may establish a timeline platform for at least one IoT device to be controlled in the specified time unit, day unit, or cycle unit and may set the driving pattern of the electronic device 200 based on the timeline. The user may access the network based on the external device 300 to transmit information associated with the timeline and the driving of the electronic device 200 to the IOT server 100 or the electronic device 200. As such, the electronic device 200 may drive on the corresponding path based on the driving pattern of the time unit, the day unit or the cycle unit for at least one IoT device specified by the timeline.

According to various embodiments described above, a movable electronic device according to an embodiment may include at least one camera module, a driving module configured to support movement on a specified path of the electronic device, and a processor electrically connected to the camera module and the driving module.

According to various embodiments, the processor may be configured to control the electronic device to perform capture while moving on a specified first path and to set the first path to a second path based on state information about at least one Internet of Things (IoT) device obtained based on a capture image on the first path.

According to various embodiments, the processor may be configured to exclude the first zone from the second path, when an IoT device disposed in a first zone on the first path is in an off-state and there is no dynamic object in the first zone.

According to various embodiments, the processor may be configured to change the second path to the first path, when the electronic device moves on the second path for the specified number of times or more.

According to various embodiments, the processor may be configured to change the second path to the first path, when a new dynamic object is present on an image captured for the second path by the electronic device.

According to various embodiments, the processor may be configured to obtain the state information about the at least one IoT device, based on image analysis of the capture image.

According to various embodiments, the processor may be configured to obtain the state information about the at least one IoT device, based on image analysis of the capture image and information received from an IoT platform managing the at least one IoT device.

According to various embodiments, the processor may be configured to map the state information about the at least one IoT device to region information in which an IoT environment is operated.

According to various embodiments, the processor may be configured to transmit at least one of the capture image or the state information about the at least one IoT device, to an external device.

According to various embodiments, the processor may be configured to assign the first path in response to user control or to assign the first path based on autonomous driving of the electronic device.

Figure 8:
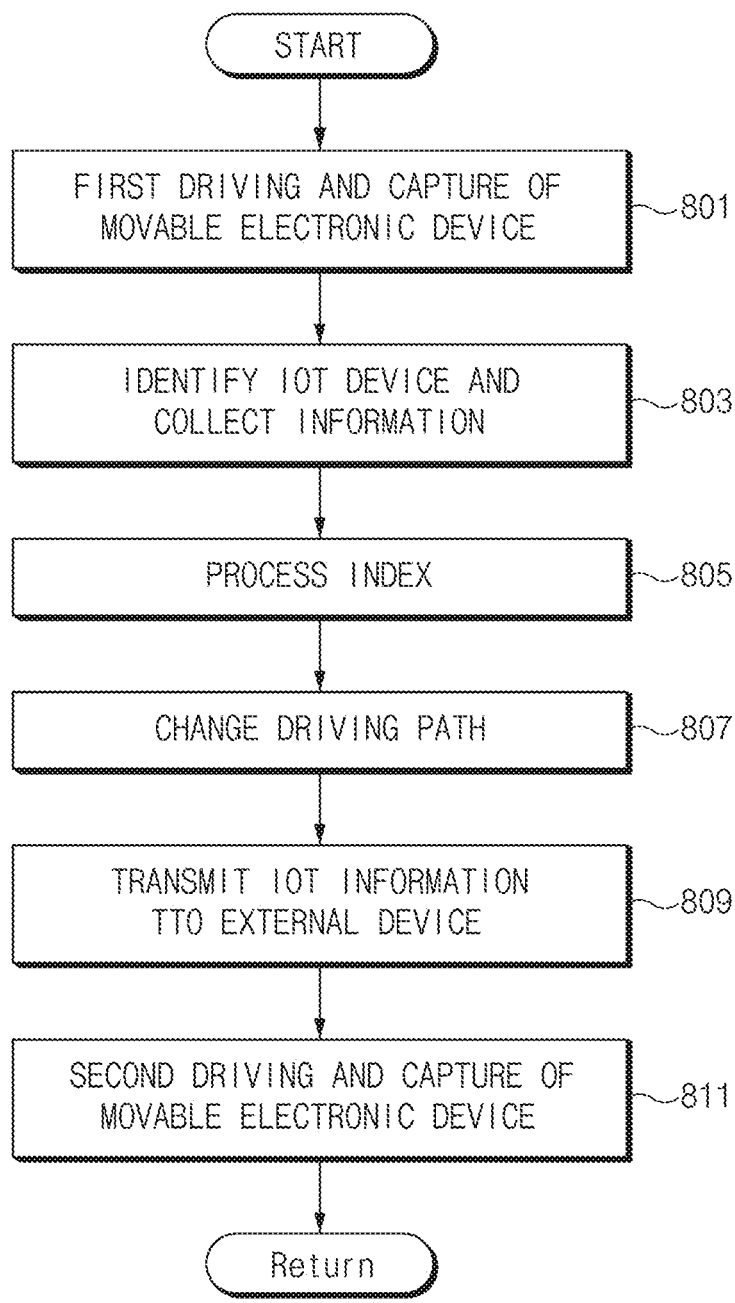
FIG. 8 is a diagram illustrating a monitoring system controlling method of an electronic device, according to an embodiment.

FIG. 8 is a diagram illustrating a monitoring system controlling method of an electronic device, according to an embodiment.

Referring to FIG. 8, in operation 801, a mobile electronic device (e.g., 200 of FIG. 2) may perform driving (or walking or flying) on a specified first path. In this operation, the mobile electronic device may capture at least one IoT device disposed on (or adjacent to) the first path based on the provided at least one camera module (e.g., 220 in FIG. 2).

In operation 803, the mobile electronic device may perform image analysis on the captured image or video to detect at least one IoT device included in the captured image or video and may perform determination of the identification and state (e.g., real-time state) for each IoT device. For example, the mobile electronic device may identify the detected at least one IoT device by obtaining and referring to information (e.g., identification information, attribute information, location information, motion information, shape information, state information, or the like) about the IoT device from the IoT platform (e.g., the IoT server 100 of FIG. 2) which collectively manages the at least one IoT device. In various embodiments, when the at least one IoT device includes information about bar coding or RFID tag, the mobile electronic device may identify the IoT device based on a scanner or reader. Furthermore, the mobile electronic device may determine the state of the identified IoT device (e.g., real-time on or off state) through comparing information about the identified at least one IoT device with information about the IoT device received from the IoT platform (e.g., the IoT server 100 of FIG. 2).

In operation 805, the mobile electronic device may map information (e.g., identification information, attribute information, location information, motion information, shape information, state information, or the like) about the identified IoT device to the operating region information (e.g., blueprint) of the IoT environment received from the IoT platform.

In operation 807, the mobile electronic device may update or change the first path based on the real-time state information about the identified IoT device. For example, when a dynamic object (e.g., a person, an animal, or the like) is not detected in the first zone on the first path and it is determined that the IoT device disposed in the first zone is in the off state (or closed or turned off), the mobile electronic device may change the first path to the second path in which the driving or capture (or monitoring) of the first zone is excluded.

In operation 809, the mobile electronic device may transmit, to an external device, the captured image or video and information (e.g., identification information, attribute information, location information, motion information, shape information, state information, or the like) about the identified at least one IoT device.

In operation 811, the mobile electronic device may perform monitoring on at least one IoT device while driving on the changed second path. In this operation, when the mobile electronic device drives on the second path for the specified number of times or more without any change of at least one IoT device disposed on or adjacent to the second path, the mobile electronic device may update the second path to the first path that is the previous path. Alternatively, in various embodiments, in the driving or capture operation of the second path, when a new dynamic object is detected, the mobile electronic device may update the second path to the first path.

According to various embodiments described above, a monitoring system controlling method may include capturing at least one IoT device disposed on a specified first path, based on a movable electronic device, identifying at least one IoT device on a capture image to obtain state information about identified IoT device, and changing the first path to a second path based on the state information about the at least one IoT device.

According to various embodiments, the obtaining may include performing image analysis on the capture image and obtaining information about the at least one IoT device from an IoT platform managing the at least one IoT device.

According to various embodiments, the changing may include mapping the state information about the at least one IoT device to region information in which an IoT environment is operated.

According to various embodiments, the changing may include excluding the first zone from the second path when an IoT device disposed in a first zone on the first path is in an off-state and there is no dynamic object in the first zone.

According to various embodiments, the changing may include changing the second path to the first path when the electronic device moves on the second path for the specified number of times or more.

According to various embodiments, the changing may include changing the second path to the first path when a new dynamic object is present on an image captured for the second path by the electronic device.

According to various embodiments, the monitoring system controlling method may further include transmitting, by the electronic device, the capture image and state information about the at least one IoT device to an external device.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, the electronic device comprising:
a camera;
a motor configured to move the electronic device; and
a processor electrically connected to the camera and the motor, wherein the processor is configured to:
control the motor to move the electronic device along a first path including a first zone that a first Internet of Things (IoT) device is disposed,
control the camera to capture a plurality of images while moving on the first path,
determine state information of the first IoT device as one of either a powered on state or a powered off state through image processing that visually detects changes in the first IoT device based on a comparison of the plurality of images of the first IoT device captured on the first path, and
change the first path to a second path excluding the first zone based on the state information.

2. The electronic device of claim 1, wherein the processor is further configured to:
when the first IoT device is in the powered off state, identify whether a moving object is disposed in the first zone, and
when the moving object is not disposed in the first zone, exclude the first zone from the second path.

3. The electronic device of claim 1, wherein the processor is further configured to:
determine whether the electronic device moves in the second path more than a specified number of times, and
when the electronic device has moved on the second path more than the specified number of times, change the second path to the first path.

4. The electronic device of claim 1, wherein the processor is further configured to:
control the camera to capture a plurality of images while moving on the second path, and
when another moving object is present in the plurality of images captured on the second path, change the second path to the first path.

5. The electronic device of claim 1, wherein the processor is further configured to:
based on an analysis of the first image, determine the state information.

6. The electronic device of claim 1, wherein the processor is further configured to:
based on an analysis of the first image and information received from an IoT platform that controls the first IoT device, obtain the state information.

7. The electronic device of claim 1, wherein the processor is further configured to:
map the state information to region information in which an IoT environment is operated.

8. The electronic device of claim 1, wherein the processor is further configured to:
transmit the first image or the state information to an external device.

9. The electronic device of claim 1, wherein the processor is further configured to:
assign the first path in response to user control, or
assign the first path based on autonomous driving of the electronic device.

10. A method of controlling movement of an electronic device, the method comprising:
controlling the electronic device to move along a first path including a first zone that a first Internet of Things (IoT) device is disposed;
controlling the electronic device to capture a plurality of images while moving on the first path;
determining state information of the first IoT device as one of either a powered on state or a powered off state through images processing that visually detects changes in the first IoT device based on a comparison of the plurality of images of the first IoT device captured on the first path; and
changing the first path to a second path excluding the first zone based on the state information.

11. The method of claim 10, wherein the determining of the state information comprises:
analyzing the first image to identify the first IoT device, and
obtaining information about the first IoT device from an IoT platform that manages the first IoT device.

12. The method of claim 10, wherein the changing of the first path to the second path comprises:
mapping the state information to region information in which an IoT environment is operated.

13. The method of claim 10, wherein the changing of the first path to the second path comprises:
when the first IoT device is in an off state and there is no moving object in the first zone, excluding the first zone from the second path.

14. The method of claim 10, wherein the changing of the first path to the second path comprises:
determining whether the electronic device moves on the second path more than a specified number of times; and
when the electronic device has moved on the second path more than the specified number of times, changing the second path to the first path.

15. The method of claim 10, further comprising:
controlling the electronic device to capture a plurality of images while moving on the second path; and
when another moving object is present in the plurality of images captured on the second path, changing the second path to the first path.

16. The electronic device of claim 1, wherein the processor is further configured to:
identify a physical shape of the first IoT device in the first image, and
transmit a request to an IoT platform for the state information.

17. The electronic device of claim 16,
wherein the processor is further configured to receive identifier information from the first IoT device, and
wherein the request includes the identifier information.

18. The method of claim 10, further comprising:
identifying a physical shape of the first IoT device in the first image, and
transmitting a request to an IoT platform for the state information of the first IoT device.

19. The method of claim 18, further comprising receiving identifier information from the first IoT device,
   wherein the request includes the identifier information.

\* \* \* \* \*